United States Patent [19]

Warren

[11] 4,135,443

[45] Jan. 23, 1979

[54] SELF-ADJUSTING BREATHER BAG

[75] Inventor: Bruce J. Warren, McHenry, Ill.

[73] Assignee: A. O. Smith Harvestore Products, Inc., Arlington Heights, Ill.

[21] Appl. No.: 787,325

[22] Filed: Apr. 14, 1977

[51] Int. Cl.² .................. A23P 1/00; A01F 25/00; A01F 25/16
[52] U.S. Cl. .................. 99/646 S; 220/85 B
[58] Field of Search .............. 99/646 S, 646 R; 98/54, 98/55; 220/85 B, 86 R; 150/1

[56] References Cited

U.S. PATENT DOCUMENTS

| 3,097,677 | 7/1963 | Mitchell | 220/86 R |
| 3,193,058 | 7/1965 | Ebbinghaus | 99/646 S |

FOREIGN PATENT DOCUMENTS 561241  8/1958  Canada .................. 220/85 B

Primary Examiner—Harvey C. Hornsby
Assistant Examiner—Timothy F. Simone
Attorney, Agent, or Firm—Andrus, Sceales, Starke & Sawall

[57] ABSTRACT

A self-adjusting breather bag for use in sealed storage structures to limit the contact of ambient atmosphere with the stored material. The self-adjusting of the lower part of the bag to a higher position in the structure is accomplished by strategically assembling elastic or resilient members inside or outside the bag which automatically raises the lower portion of the bag when the bag is in a substantially non-inflated condition. A retracting device may be used to store the elastic or resilient members to provide for a greater range of inflation and retraction of the bag.

10 Claims, 16 Drawing Figures

SELF-ADJUSTING BREATHER BAG

BACKGROUND OF THE INVENTION

An internal breather bag system has been used in conjunction with upright sealed storage structures such as that illustrated in U.S. Pat. No. 3,568,588 to limit the contact between ambient atmosphere and stored material. To provide for high levels of storage, various systems of cord linkages have been used that allow the operator to pull the deflated bags toward the roof before the structure is filled with material. Access to the pull cords is not always convenient and neglecting to pull up the breather bag or bags often results in damage to the bags. These problems are eliminated by the system of the invention in assembling strategically placed elastic or resilient members with the breather bags which operate to automatically raise the lower portion of the bags during periods of non-inflation of the bags.

SUMMARY OF THE INVENTION

The invention is particularly directed to the attachment of elongated elastic strips or cords or like resilient members at each end to tabs or oar locks located inside the bag both at the upper and lower portions of the bag. The usual procedure is to attach two pair of the members at the upper end to a single tab and then extend them downwardly on both sides of the bag and spread them apart to form a cone-like appearance. They are then attached at the lower end to separate and laterally spaced members such as oar locks. The number of the resilient members employed throughout the length of each bag depends on the size of the bag and the height to which it is determined the bag should be raised. In some cases the resilient or elastic members may encircle the bag particularly if the bag is located externally of the structure to be protected.

Under another embodiment of the invention the elastic or resilient members, usually cords or strips, may be secured in an elongated tube located inside the bag and extend therethrough and over pulleys at the ends of the tube and then are attached to various points in the top and bottom of the bag. The storing of the elastic or resilient member in the tube provides a greater length to these members to retract larger bags and always provides enough length to lift the bottom portions of the bag within the elastic limit of the elastic or resilient members. In some cases the resilient member may be springs stored in the tube to which ropes or cables are attached.

BRIEF DESCRIPTION OF THE PREFERRED EMBODIMENTS OF THE INVENTION

Figure 1:
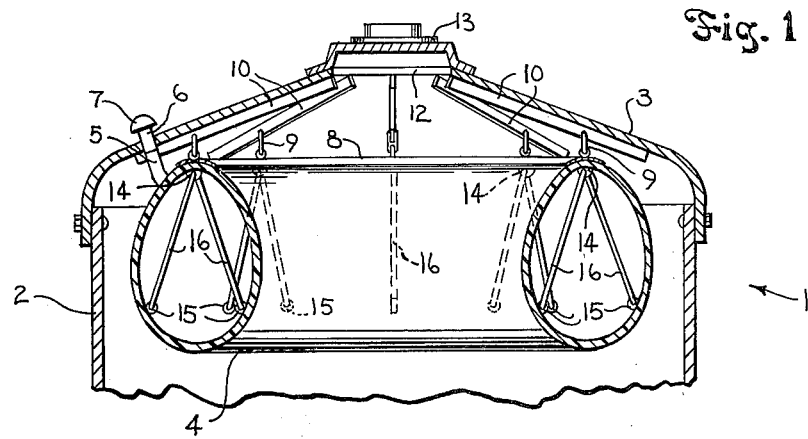
FIG. 1 of the drawings is a sectional view with parts in elevation of the upper end portion of a substantially airtight storage structure with a somewhat curved breather bag in inflated position.
Figure 2:
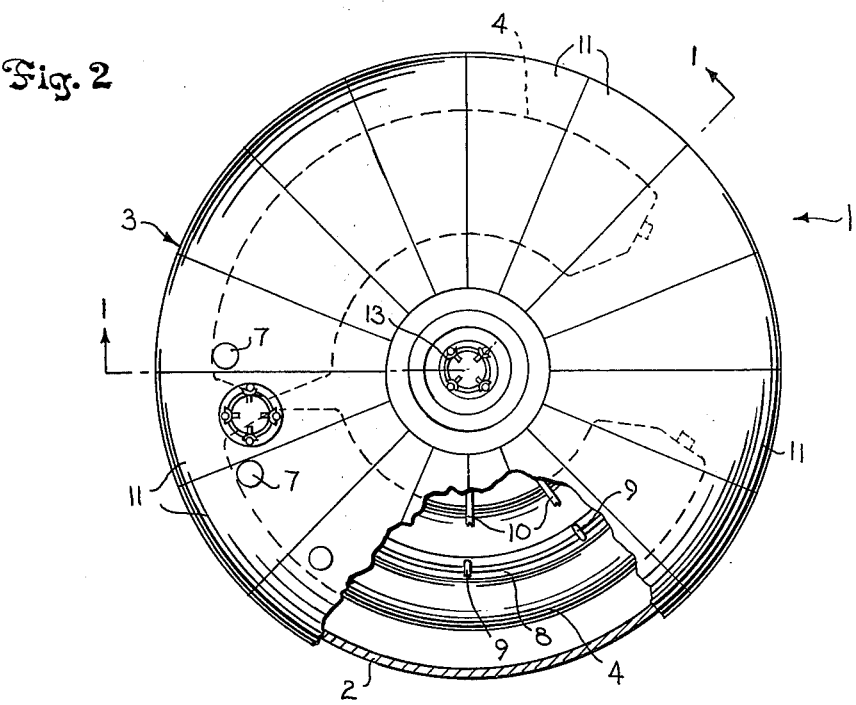
FIG. 2 is a top plan view of FIG. 1 with a portion of the roof removed and parts in section.

Referring to FIGS. 1-2 of the drawings there is shown a portion of a substantially airtight storage structure 1 such as a silo adapted to contain silage, haylage or other materials which require protection from spoilage by the ambient atmosphere. Structure 1 is normally supported on a concrete foundation, not shown, and includes a generally cylindrical shell 2 and a roof 3. The silage or other stored material is removed from the storage structure by a bottom unloader, not shown, similar in structure and function to that described and shown in Tiedemann U.S. Pat. No. 2,635,770. The unloading apparatus forms no part of the present invention.

In order to balance the internal pressure and the external pressure within storage structure 1 so that air cannot reach the material stored therein, for purposes of illustration, a pair of breather bags 4 are located in the upper end portion of structure 1. Bags 4 are generally curved in length to conform to the curvature of the structure and each bag 4 in the illustration extends substantially half way around the interior of structure 1. Each bag 4 is connected at one end to a hose 5 extending through roof 3 to the outside of the structure and within a pipe 6 which is covered by a cap 7 in spaced relation to the pipe. With a decrease in pressure inside structure 1 air can flow through pipe 6 and hose 5 into the bags 4 and the bags will respond to a pressure increase or decrease inside structure 1 by contracting and discharging air through hose 5 and pipe 6 to thereby provide a constant equalization of internal and external pressure.

In order to suspend each bag 4 inside structure 1 a yoke 8 is secured to the upper portion of each bag 4 and extends substantially the length of each bag.

The upstanding portion of the yoke 8 is provided with a series of sliders 9 which engage ribs 10 suspended from roof 3 and are able to slide along ribs 10. Roof 3 is formed of panels 11 and one edge of each roof panel 11 provides the ribs 10 as a track or rail on which sliders 9 ride so that the bags can be removed by a cable, not shown, which encircles bag 4 through the opening 12 in the top of the roof when the filler cover 13 is removed. The removal of the bags forms no part of the invention but it is necessary that the bags be supported in the upper end of structure 1 and the description presented illustrates one way in which the bags may be suspended.

As bags 4 hang downwardly a substantial distance within structure 1, it is necessary that the bags be raised or elevated against roof 3 while the structure 1 is being filled. This has been accomplished previously by the use of manually operated cables attached to each bag as illustrated in Ebbinghaus U.S. Pat. No. 3,193,058. However, when the structure is closed, the cables necessarily are released which lowers the bag. Because of the funneling action, free flowing grains flow to the center of structure 1 which can then draw a breather bag into the flowing grain and destroy it.

Figure 3:
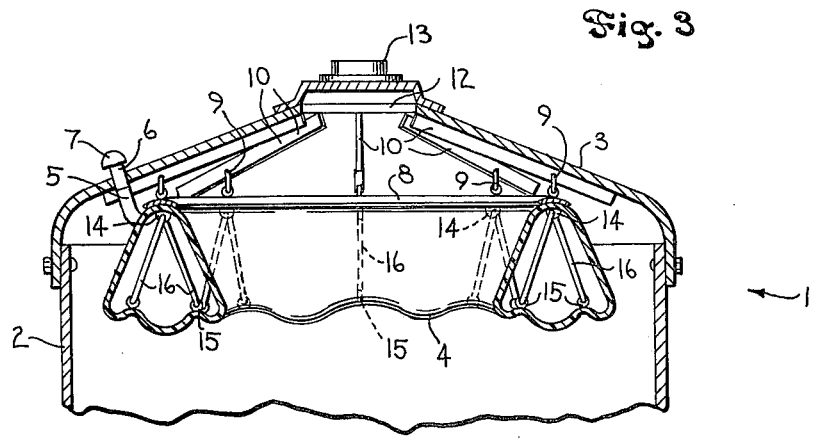
FIG. 3 is a view similar to FIG. 1 with the breather bag in deflated condition.

The improved construction of the invention is shown in various forms in the drawings. Referring to FIGS. 1 and 3 of the drawing as particularly illustrated with respect to one of the bags 4 in FIGS. 1 and 3, bag 4 is provided internally with circumferentially spaced generally centrally located tabs or oar locks 14 at the upper end portion of the bag which are cemented or heat sealed or otherwise secured to bag 4. Additional oar locks 15 are secured to the inside of bag adjacent the lower end of bag 4 located in general opposite to each other.

As illustrated in FIGS. 1 and 3, an elastic or resilient cord or cable or any corresponding expansible and contracting means 16 is secured to oar lock 15 as shown in the left side of the drawing in FIGS. 1 and 3 and extends upwardly inside bag 4 and in engagement with oar lock 14 and thence downwardly on the opposite side of bag 4 and is secured at the lower end to a second oar lock 15. As illustrated in connection with the inflated breather bag 4 of FIG. 1 and the deflated breather bag 4 of FIG. 3 corresponding cords or other expansible means 4 are provided throughout the extent of bag 4 and are connected to the upper oar locks 14 and lower oar locks 15 located inside of bag 4.

Breather bags 4 may be of different materials of light weight but strong enough to confine the outside air inside bags 4. Polyvinyl chloride has proved to be one of the satisfactory materials for bags 4.

The cords or strips 16 are of an elastomer material such as for example urethane, neoprene, EPDM polymers, silicone rubber, ethylene, propylene and the like which have the property of being able at room temperature to be stretched repeatedly at least twice their original length. Designing of the cords or strips 16 involves factors such as width, thickness, strength properties of the elastomer and the size of the bag to which it is to be applied. It is contemplated that any lightweight resilient material such as springs, for example, can be substituted for cords and strips of elastomer material or used in combination with non-elastic material.

In some cases it is necessary that there be additional length in the cords or straps 16 than would be provided by the embodiment illustrated or described with respect to FIGS. 1-3. This is accomplished as illustrated in the second embodiment of the invention shown in FIGS. 4-11 and FIGS. 14-16 by the use of a retracting device.

Figure 4:
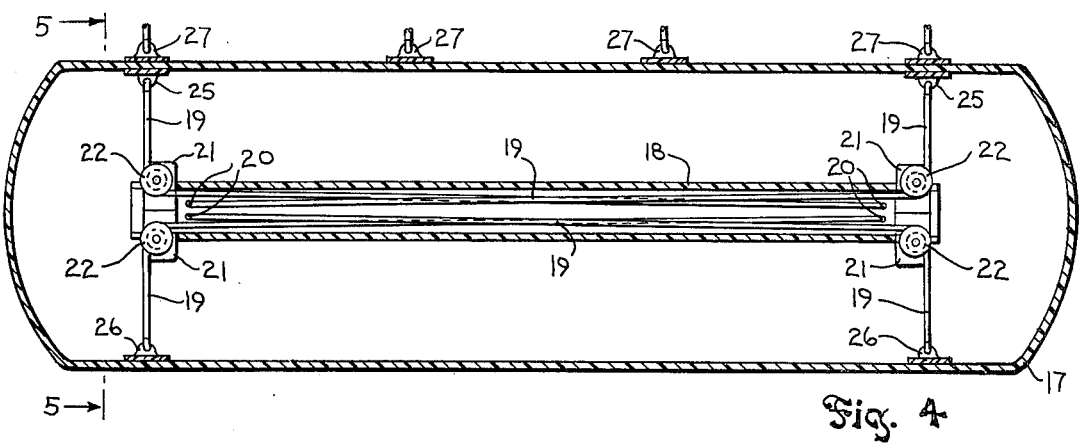
FIG. 4 is a sectional view of another embodiment of the invention illustrating a retracting device located inside a breather bag with elastic cords stored in the device and connected thereto and in turn connected to the breather bag shown in an inflated condition.
Figure 6:
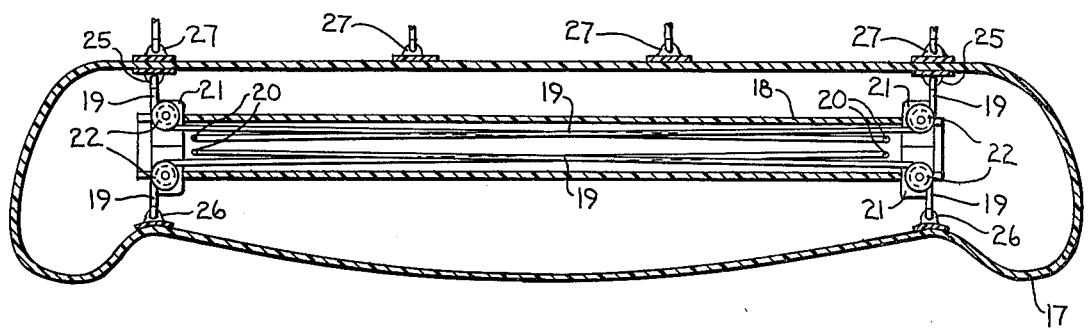
FIG. 6 is a sectional view similar to FIG. 4 with the breather bag in a deflated position.
Figure 5:
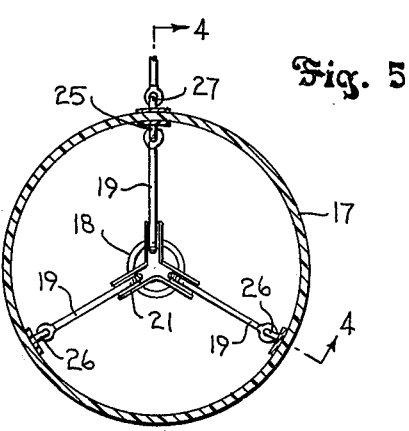
FIG. 5 is a view taken on line 5—5 of FIG. 4.
Figure 7:
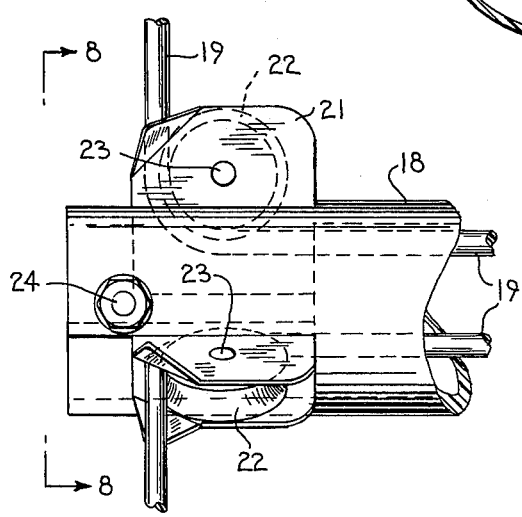
FIG. 7 is a detail view of the elastic cords overriding the pulleys located at one end of the retracting device.

FIG. 4 illustrates a bag 17 in an inflated condition and FIG. 5 shows the same bag in a deflated condition as bag 17 would appear inside of storage structure 1. Located inside the bag 17 is a tube 18 of plastic or the like which may be described as a retracting device or accumulator which takes up the elastic cord 19 anchored therein as at 20 and provides sufficient tension to lift breather bag 17 as internal pressure in storage structure 1 approaches external pressure inside bag 17.

Figure 8:
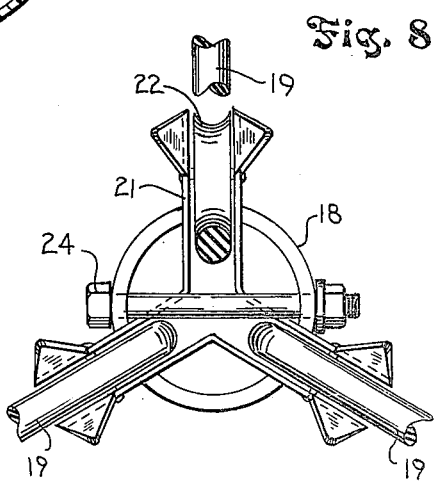
FIG. 8 is a section taken on line 8—8 of FIG. 7.

FIGS. 4 and 8 illustrate three elastic cords 19 which are stored inside of tube 18 as at 20 and extend the length of tube 18, and thence through the channeled guide bracket 21 at a respective end of tube 18 and over a pulley 22. Pulleys 22 transfer the direction of elastic cords 19 from a radial to a longitudinal or vice versa direction of movement. Cords 19 may be secured to the tube at one end or both ends may be secured to the bag 17. The pulleys 22 are distributed radially as may be observed in FIG. 5. The pulleys 22 rotate on shafts 23 extending through bracket 21 and secured thereto and the bracket 21 in turn is secured to tube 18 by the bolt 24.

In view of the radial orientation of pulleys 22, one of the elastic cords 19 extends through a guide channel of bracket 21 over a pulley 22 and thence upwardly inside bag 17 to the upper portion of bag 17 and is secured to the oar lock 25 in turn secured to bag 17. The other two cords 19 extend downwardly from retracting device 18 in an opposite diagonal direction and are secured to oar locks 26 located and secured to the lower portion of bag 17.

The bag 17 is suspended inside of the upper portion of structure 1 by a plurality of spaced grommets 27 and other members having no bearing on the present invention. Spaced grommets 27, four in number, are illustrated in FIGS. 4 and 5, although the number can be varied depending on the size of bag 17.

Figure 9:
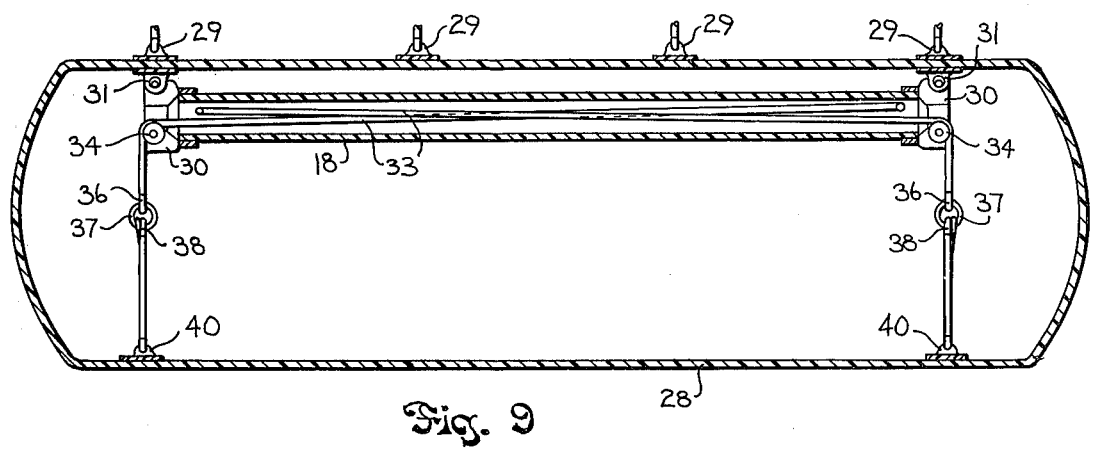
FIG. 9 is a view in section of a breather bag in inflated position with the retracting device in a different position than in FIG. 4.
Figure 10:
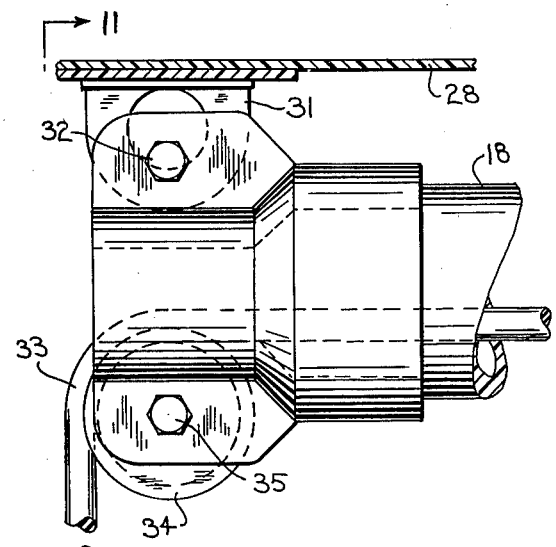
FIG. 10 is an enlarged view of the left side of the retracting device shown in FIG. 9.
Figure 11:
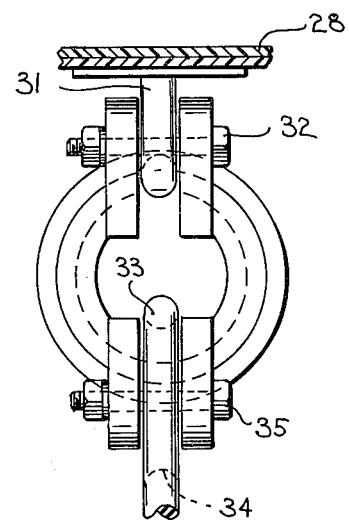
FIG. 11 is a view taken on line 11—11 of FIG. 10.

FIGS. 9-11 illustrate a different location retracting system to show the versatility of location of the retraction device or tube 18. In the construction there shown the bag 28 is suspended in the upper portion of structure 1, not shown, by the grommets 29 which are shown as four in number which again may be varied in number.

In this embodiment the tube 18 is located inside the upper portion of bag 28 and extends longitudinally therein for a substantial distance. Tube 18 at each end has secured thereto a channeled bracket 30 which is attached to the oar locks 31 by the bolt 32. Oar lock 31 in turn is secured to the inside of bag 28.

A pair of elastic cords 33 are secured to the tube 18 at opposite ends and each cord 33 extends oppositely through tube 18 then through the channel of bracket 30 and over the pulley 34 which rotates on bolt 35 securing it to bracket 30 and downwardly where a first ring 26 is then secured to a second ring 37. A pair of rings 38 are secured to the intermediate ring 37 and each supports a pair of elastic cords 39 which extend diagonally downwardly therefrom and each are secured to an oar lock 40 attached to the lower portion of bag 28.

As is evident when the retracting device or system is employed it may be located in many different positions inside the breather bag and the elastic cords located therein may extend in various directions and may be connected to the bag by means other than the use of oar locks. More than one retracting device may be used inside each breather bag.

It is also evident that other resilient members than cords could be employed. For example, a spring powered retractor might be employed with springs located inside the retractor tube with ropes or cables attached to the spring and to the bag.

The location of the elastic cords or straps inside the breather bag is particularly important when the breather bag is used inside a storage structure 1 because with the cord or strap on the outside of the bag material during filling may become trapped between the elastic cord or strap and the bag body during the filling and be retained through numerous fill and empty cycles.

However, in some cases it is desirable to have the bags located externally of storage structure 1 and in this case normally a straight bag is used rather than the curved type illustrated in the previous embodiments. Though not exposed to the possibility of having stored material accidentally placed on it, the external bag is commonly hung in a location where an increase in its hanging length upon deflection presents problems for traffic or storage area under the bag. Where an external bag is used although the internal resilient members may be employed, it may be found desirable to secure the resilient members to the outside of the bag. This type of construction is illustrated in FIGS. 12 and 13.

Figure 12:
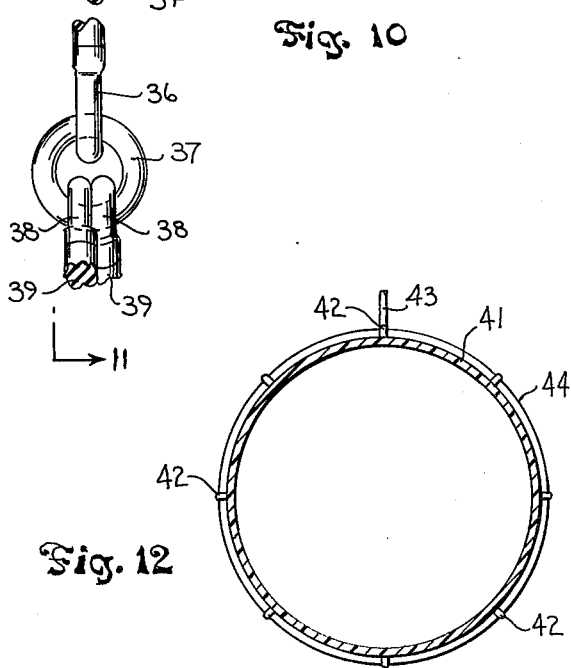
FIG. 12 illustrates an elastic cord encircling a round breather bag shown in section and in inflated condition.
Figure 13:
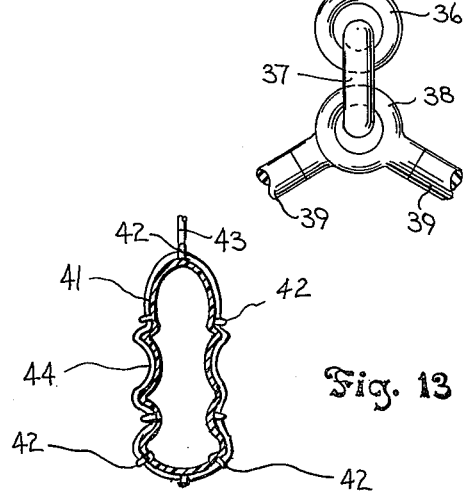
FIG. 13 illustrates the breather bag in FIG. 12 in a deflated position.

In these figures there is shown a generally round, straight bag 41 in inflated condition in FIG. 12 and deflated condition in FIG. 13. The upper portion of the bag has an oar lock or the like 42 to which the cable 43 suspends bag 41 from a beam in a barn or the like. Numerous oar locks 42 and cables 43 would be employed throughout the length of bag to suspend the bag 41. The elastic or resilient strap or cord 44 completely encircles bag 41 and extends through oar locks 42 or the like which are intermittently secured to the outside of bag 41.

The bag 41 is inflated by gases flowing through a conduit, not shown, but such as tube 20 in U.S. Pat. No. 3,510,319, which is connected to the upper part of a storage unit such as structure 1 and to bag 41, when the internal pressure inside the structure exceeds the atmosphere pressure and FIG. 12 illustrates this condition. In such condition the elastic members 44 encircling bag 41 are in expanded condition. However, when the atmosphere pressure tends to exceed the pressure inside structure 1, the gases flow through the conduit, referred to above, from bag 41 and back into structure 1 thereby causing the elastic members 44 to collapse bag 41 as illustrated in FIG. 13 because the atmosphere pressure exceeds the pressure inside bag 41.

Figure 14:
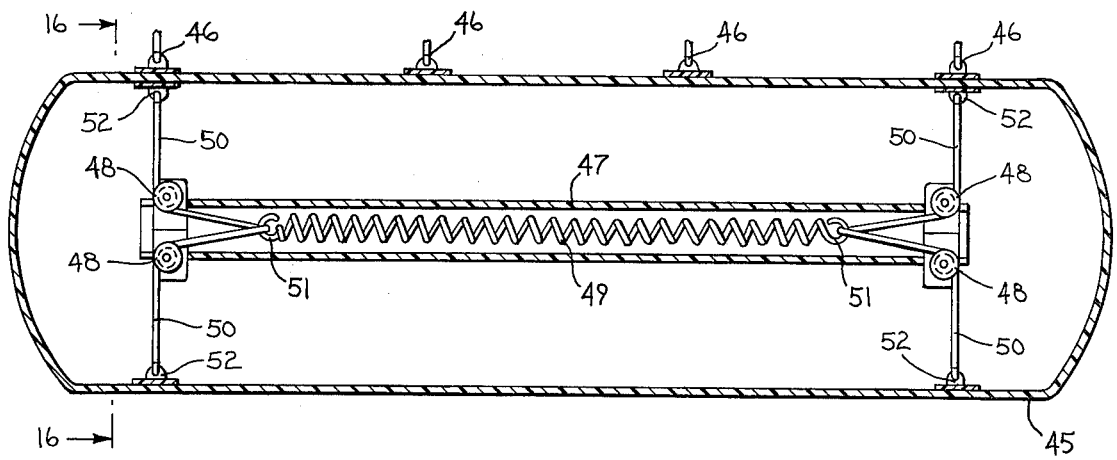
FIG. 14 is a sectional view of another embodiment of the invention illustrating a spring loaded retracting device with the breather bag in inflated condition.
Figure 15:
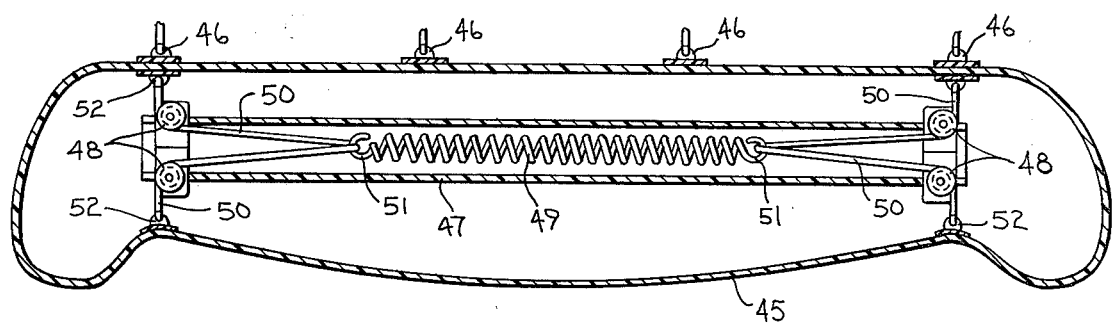
FIG. 15 is a sectional view similar to FIG. 14 with the breather bag in deflated condition.
Figure 16:
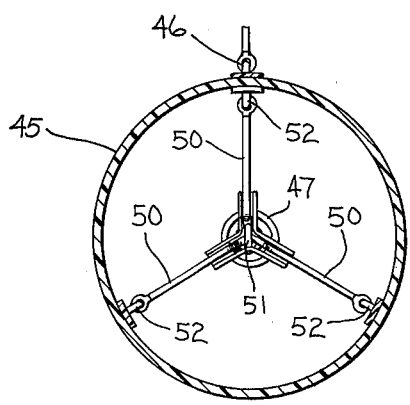
FIG. 16 is a sectional view taken on line 16—16 of FIG. 14.

A spring powered retractor is illustrated in FIGS. 14–16 of the drawings. In these Figures there is shown a breather bag 45 which is suspended inside the upper portion of structure 1 such as by a plurality of spaced grommets 46 and other suspension members having no bearing on the present invention.

Located inside of bag 45 is a tube 47 of plastic material or the like, as previously set forth with respect to FIGS. 4 and 5, which may be described as a retracting device or accumulator. A pair of pulleys 48 are secured respectively at opposite ends of tube 47, with each pair being disposed in radial orientation with each other.

A spring 49 is stored inside of tube 47 and the non-elastic strips or cords 50 illustrated in FIG. 16 as three in number are secured to opposite hooked ends 51 of spring 49. The respective cords 50 then extend out of each end of tube 47 and over pulleys 48 to change the direction of movement of cords 50 and are secured to the oar locks 52 in turn secured to the breather bag 45.

As illustrated in FIG. 14, when bag 45 is in an inflated condition the spring 49 is in an extended position inside of accumulator or tube 47. As illustrated in FIG. 15, when bag 45 is in a deflated condition the tension of spring 49 raises the bag through cords 50 as spring 49 gradually moves to a contracted position as shown in FIG. 14. FIG. 16 illustrates the location of tube or accumulator 47 generally centrally of bag 45 but it could be offset from this position.

The invention completely eliminates the use of cable or ropes to manually lift breather bags during filling and the use of elastic or resilient members to lift the bags overcomes the problem of human error by automatically raising the bottom portion of breather bags rather than having it done manually.

Various modes of carrying out the invention are contemplated as being within the scope of the following claims particularly pointing out and distinctly claiming the subject matter which is regarded as the invention.

I claim:

1. A self-adjusting breather system for use in connection with a substantially sealed storage structure, which comprises a breather bag assembled with the storage structure and connected thereto to prevent contact of the ambient air with the stored material whereby under certain conditions the bag is in an inflated or a deflated condition, and a plurality of longitudinally extending self-adjusting resilient members intermittently connected to at least the upper and the lower portions of the bag and which have sufficient resilience to elongate and stretch repeatedly and thereby expand a substantial distance downwardly when the bag is in an inflated condition and to automatically retract to substantially an initial position and pull the bottom portion of the bag upwardly toward the upper portion of the bag when the bag is in a deflated condition due to external and internal pressure changes.

2. The self-adjusting breather system of claim 1 in which the resilient members are located inside the bag and being sufficiently resilient to be stretched repeatedly at least twice their original length.

3. The self-adjusting breather system of claim 1 in which the resilient members extend over the outside of the bag.

4. The self-adjusting breather system of claim 1, and a retracting device comprising an elongated tube secured inside of the bag, and the resilient members being stored in the tube to provide greater length in the resilient member.

5. The self-adjusting breather system of claim 1 in which the resilient members are of elastomer material cords.

6. The self-adjusting breather system of claim 1 in which the resilient members are strips of elastomer material.

7. The self-adjusting breather system of claim 1 in which a plurality of anchoring members are secured in intermittent laterally spaced relation inside of the upper portion of the bag, a series of pairs of anchoring members secured generally opposite each other inside the lower part of the bag and in substantial alignment with one of the anchoring members in the upper portion of the bag, and the resilient members being secured to the anchoring members in the upper portion of the bag and to the anchoring members in the lower portion of the bag.

8. The self-adjusting breather system of claim 4, and a bracket secured to each end of the elongated tube, a shaft extending through each bracket, a pulley secured to each responsive shaft held by the bracket, and the resilient members stored in the tube being elastic cords which extend the length of the tube and then out through each respective bracket and over the pulleys, and means to secure the free ends of the elastic cord to a portion of the bag.

9. The self-adjusting breather system of claim 8 in which the elastic cords extending from the ends of the tube are secured to both the upper portions and lower portions of the bag.

10. The self-adjusting breather system of claim 4 in which the resilient members stored in the tube are springs and the connection of said springs to the bag is a non-resilient member.

* * * * *

UNITED STATES PATENT AND TRADEMARK OFFICE
CERTIFICATE OF CORRECTION

PATENT NO. : 4,135,443
DATED : January 23, 1979
INVENTOR(S) : BRUCE J. WARREN

It is certified that error appears in the above-identified patent and that said Letters Patent are hereby corrected as shown below:

Column 5, line 9, After "upon" cancel "deflection" and insert ---deflation---;

Column 6, line 36, After "are" insert ---cords---;
CLAIM 5

Column 6, line 37, Cancel "cords";
CLAIM 5

Column 6, line 55, After "each" cancel "responsive" and insert ---respective---.
CLAIM 8

Signed and Sealed this

Eighth Day of May 1979

[SEAL]

Attest:

RUTH C. MASON
Attesting Officer

DONALD W. BANNER
Commissioner of Patents and Trademarks